Patented May 12, 1953

2,638,464

UNITED STATES PATENT OFFICE 2,638,464

POLYMERIZATION OF VINYLIDENE COMPOUNDS IN THE PRESENCE OF A CATALYST COMPOSITION COMPRISING DIMETHYLHALOPHENYLHYDROPEROXYMETHANE

William B. Reynolds, John E. Wicklatz, and Thomas J. Kennedy, Bartlesville, Okla., assignors to Phillips Petroleum Company, a corporation of Delaware No Drawing. Application December 16, 1949, Serial No. 133,466

11 Claims. (Cl. 260—84.1)

This invention relates to an improved process for polymerizing unsaturated organic compounds while dispersed in an aqueous emulsion. In one important aspect this invention relates to the use of faster recipes at low polymerization temperatures for effecting production of synthetic rubber by emulsion polymerization of conjugated diolefins.

With the increasing interest in low temperature emulsion polymerization, many variations in recipes and procedure have been developed in the interest of economy and efficiency in addition to the attention given to producing polymeric materials having the desired characteristics. Recipes of the redox type, that is, formulations wherein both oxidizing and reducing components are present, have been widely used. Oxidizing components frequently employed include materials of a peroxidic nature, and particularly compounds such as benzoyl peroxide and cumene hydroperoxide. Even though any peroxidic material might be expected to function in the capacity of the oxidant in a redox emulsion polymerization system, this is not necessarily the case since in some instances little, if any, polymerization occurs while in other cases with different peroxides the reaction takes place at a satisfactory rate. Some peroxides may function fairly satisfactorily at higher temperatures but are of little value when it is desired to carry out polymerizations at low temperatures, say below the freezing point of water.

We have now discovered that rapid conversion rates are obtained when carrying out emulsion polymerization reactions, even at low temperatures, using recipes in which the polymerization catalyst composition comprises an oxidant and a reductant and in which the oxidizing component employed is a dimethyl(halophenyl)-hydroperoxymethane having the formula

wherein X is a halogen other than iodine and $x$ is an integer from 1 to 4, inclusive, such as is formed upon reaction of free oxygen with a dimethyl(halophenyl)methane. We have also discovered that these dimethyl(halophenyl)hydroperoxymethanes are superior to dimethylphenylhydroperoxymethane itself as oxidants for use in emulsion polymerization reactions, and with some recipes it is possible to effect satisfactory polymerization without having present in the polymerization system any salt of a heavy metal, such as iron.

The halogen-substituted hydroperoxymethanes which are applicable in this invention can be represented by the formula

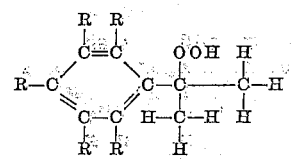

wherein each R is selected from the group consisting of hydrogen, fluorine, chlorine, or bromine, with at least one R halogen atom present in the molecule but with the number of halogen atoms attached to the aromatic ring not greater than four. When two or more halogen substituents are present in the molecule, they can be alike or different.

An object of this invention is to polymerize unsaturated organic compounds.

Another object of this invention is to produce synthetic rubber.

A further object of this invention is to polymerize a monomeric material comprising a conjugated diene while dispersed in an aqueous medium.

Still another object of this invention is to effect rapid polymerization at low polymerization temperatures of monomeric materials dispersed in aqueous media.

Further objects and advantages of this invention will become apparent, to one skilled in the art, from the accompanying disclosure and discussion.

The hydroperoxymethanes, or hydroperoxides, used in the practice of this invention can easily be prepared by simple oxidation, with free oxygen, of the corresponding dimethyl(halophenyl)-methane. The compound to be oxidized is placed in a reactor, with an inert solvent, if desired, heated to the desired temperature, and oxygen introduced at a controlled rate throughout the reaction period. The mixture is agitated during the reaction which is generally allowed to continue from about one to ten hours. The temperature employed is preferably maintained between 50 and 175° C., although in some instances it might be desirable to operate outside this range, that is, at either higher or lower temperatures. At the conclusion of the reaction the oxidized mixture may be employed as such, that is, as a solution of the hydroperoxymethane in the reaction mixture, or unreacted material may be removed and residual hydroperoxide material employed. Other methods of producing such dimethyl(halophenyl)hydroperoxymethanes can be used, if desired. These hydroperoxide compositions not only give faster polymerization rates when used to effect emulsion polymerizations, but their use also frequently results in a more uniform reaction rate over a given reaction period than do hydroperoxides heretofore used. These advantages are particularly pronounced at polymerization temperatures below 10° C., and down to polymerization temperatures as low as —30 or —40° C., or lower.

We use the hydroperoxides discussed herein as oxidants in polymerization recipes at low polymerization temperatures, i. e. from about 10° C., or just above the freezing point of water, to well below the freezing point of water, such as —40° C. or lower. The recipe will also include a compound or composition which will act as a reductant in the presence of such hydroperoxides under the polymerization conditions set forth herein. Apparently the hydroperoxides and such a reductant slowly interact during the course of the polymerization to produce or generate free radicals, which continually initiate chain-type polymerization reactions. In some recipes such a reductant will be a single compound, or a mixture of homologous compounds, such as hydrazine, ethylenediamine, diethylenetriamine, aminoethylethanolamine, ethylenemethylenetriamine, tetraethylenepentamine, and the like. These compounds have the general formula

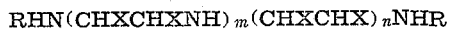

RHN(CHXCHXNH)$_m$(CHXCHX)$_n$NHR where each R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and can be of mixed character when containing six or more carbon atoms, such as alkylcycloalkyl, aralkyl, alkaryl groups, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e. mercapto compounds and thioethers) and halogen compounds. In such recipes, such a polyamino compound appears to act as a reductant, and no other activating ingredients, such as compounds of polyvalent-multivalent metals, or reducing ingredients, such as a reducing sugar, need be present in order to obtain satisfactory and rapid polymerization of the monomeric material, even at subfreezing temperatures. The amount of polyamino compound used to obtain optimum results also is dependent upon other ingredients in the recipe. Preferred results are usually obtained with between 0.02 to 5 parts by weight, per 100 parts of monomeric material, of the polyamino compound. In other recipes a composition is used which comprises one compound which is an oxidation catalyst, or activator, and another different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable organic compound having a hydroxy group on a carbon atom directly attached to an aldehyde or ketone group. Compounds frequently employed in this capacity are glucose, levulose, sorbose, invert sugar, hydroxy acetone, glyceraldehyde, and other aldoses and ketoses. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

As previously stated, it is usually desirable that the multivalent metal be present in its lower valence state. With some recipes, it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result, the multivalent ion will be partially reduced, and a substantial amount of the multivalent ion will be present in its lower valence state when the activator solution is ready for addition to the polymerization mixture.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alykyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha - chloro - acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semi-continuously, or continuously. The total pressure on the reactants is preferably at least as great as the total vapor pressure of the mixture, so that the initial reactants will be present in liquid phase. Usually 50 to 98 per cent of the monomeric material is polymerized.

It is one of the outstanding advantages of the use of the hydroperoxides, as disclosed herein, that it is feasible to produce "high solids" latices, i. e. latices resulting from the use of an amount of aqueous medium in the lower part of the range disclosed, i. e. a ratio of aqueous phase to monomeric material between 0.5:1 to 1:1 and an extent of conversion in the higher part of the range disclosed, i. e. from 70 per cent conversion to complete conversion.

Emulsifying agents which are applicable in these low temperature polymerizations are materials such as potassium laurate, potassium oleate, and the like, and salts of rosin acids. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH can be within the range of 9 to 12, with the narrower range of 9.5 to 10.5 being most generally preferred, except when a polyamino compound is used as a reductant, in which case a somewhat higher pH should usually be used.

In preparing synthetic rubber by polymerizing conjugated dienes by the process of the invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compounds or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

The amount of hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i. e. when the monomeric material is measured in pounds the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide, since it is promptly converted to the hydroperoxide by hydrolysis when the salt is admixed with the aqueous medium of the polymerization reaction mixture.

Advantages of this invention are illustrated by the following examples. The reactants, and their proportions, and the other specific ingredients of the recipes are presented as being typical and should not be construed to limit the invention unduly.

*Example I*

Dimethyl(chlorophenyl)methane (100 parts), prepared by the alkylation of chlorobenzene with propylene, was oxidized by charging it to a reactor together with 1.3 part of the potassium salt of triisopropylbenzene hydroperoxide, this latter compound being employed as an initiator for the reaction. The temperature was adjusted to 140° C. and dry oxygen introduced over a 5-hour period while the mixture was stirred. The concentration of hydroperoxymethane at this point was 11.0 per cent by weight. Portions of this material were used to supply the resulting dimethyl(chlorophenyl)hydroperoxymethane, in the amounts indicated, as the oxidant in the following polymerization recipe

| | Parts by weight |
|---|---|
| Butadiene | 72 |
| Styrene | 28 |
| Water, total | 180 |
| Rosin soap, potassium salt [1] | 4.7 |
| Mercaptan blend [2] | 0.25 |
| Dimethyl(chlorophenyl) hydroperoxymethane | Variable |
| Potassium hydroxide | 0.037 |
| Potassium chloride | 0.5 |
| Dextrose | 1.0 |
| Activator composition: | |
| $K_4P_2O_7$ | 0.165 (0.50 millimol) |
| $FeSO_4.7H_2O$ | 0.14 (0.50 millimol) |
| Water to make 25 parts of solution. | |

[1] Dresinate 214; solution pH 10.
[2] A blend of tertiary $C_{12}$, $C_{14}$, and $C_{16}$ aliphatic mercaptans in a ratio of 3:1:1 parts by weight.

The activator composition was prepared by heating a mixture of the ferrous sulfate, potassium pyrophosphate, and water at 60° C. for 20 minutes.

The dextrose, potassium hydroxide, and 25 parts water were heated at 70° C. for 25 minutes and added to the soap solution. The mercaptan dissolved in the styrene was then added, the temperature adjusted to the desired level, the butadiene introduced followed by the hydroperoxide, and finally the activator composition. Polymerization was effected at 5° C. The time-conversion data are recorded below together with the amounts of hydroperoxide employed. For purposes of comparison, a control run was made using cumene hydroperoxide (dimethylphenylhydroperoxymethane) in an amount previously found to be optimum for the recipe.

| Hydroperoxymethane | | | $FeSO_4.7H_2O$ Parts | Mols Hydroperoxymethane per Mol Fe++ | Conversion, Percent | | |
|---|---|---|---|---|---|---|---|
| From (Parent Compound) | Parts | Millimols | | | 2 Hrs. | 5 Hrs. | 7 Hrs. |
| Dimethyl(chlorophenyl)methane | 0.07 | 0.375 | 0.14 | 0.75 | 20.8 | 56.0 | 77.4 |
| Do | 0.0935 | 0.50 | 0.14 | 1.0 | 17.3 | 53.4 | 75.4 |
| Do | 0.14 | 0.75 | 0.14 | 1.5 | 14.3 | 46.4 | 68.8 |
| Dimethylphenylmethane | 0.1 | 0.66 | 0.14 | 1.3 | 12.9 | 31.4 | 49.3 |

These data show the superiority of dimethyl(chlorophenyl)hydroperoxymethane over dimethylphenylhydroperoxymethane as an oxidant in low temperature emulsion polymerization reactions.

*Example II*

Polymerization of a monomeric material comprising 1,3-butadiene and styrene was carried out, using the following recipe and a polymerization temperature of −10° C.

| | Parts by weight |
|---|---|
| Butadiene | 70 |
| Styrene | 30 |
| Water, total | 180 |
| Methanol | 45 |
| Potassium rosin soap, pH 12.2 | 3.5 |
| Potassium fatty acid soap (ORR) | 1.5 |
| Blend tert-$C_{12}$, $C_{14}$, $C_{16}$ alkyl mercaptans | 0.25 |
| Hydroperoxide | Variable (0.5 millimol) |
| Tetraethylenepentamine | 0.19 (1.0 millimol) |
| $K_3PO_4$ | 0.5 |

In one run the hydroperoxide was that obtained from oxidizing dimethyl(chlorophenyl)methane with 7 per cent conversion in 4 hours, 12 per cent in 6.5 hours, and 60 per cent in 24 hours. In an accompanying run the hydroperoxide used was obtained from oxidizing cumene, as discussed herein, with 6 per cent conversion in 4 hours, 12 per cent in 6.5 hours, and 45 per cent in 24 hours.

*Example III*

Dimethyl(dichlorophenyl)methane (100 parts), prepared by the alkylation of a mixture of ortho- and para-dichlorobenzene (principally the ortho compound) with propylene, was oxidized by charging it to a reactor together with one part of the potassium salt of tert-butylisopropylbenzene hydroperoxide, this latter compound being employed as an initiator for the reaction. The temperature was adjusted to 130° C. and dry oxygen introduced over a 3.75-hour period while the mixture was stirred. The concentration of hydroperoxymethane at this point was 14.8 per cent by weight. Portions of this material were used to supply the resulting dimethyl(dichlorophenyl)hydroperoxymethane, in the amounts indicated, as the oxidant in a series of runs using the polymerization recipe given in Example I. The procedure of Example I was followed for the preparation of the activator composition, charging the materials to the reactor, and carrying out the polymerization. The time-conversion data are recorded below together with the amounts of hydroperoxymethane employed. For purposes of comparison, a control run was made using dimethylphenylmethane in an amount previously found to be optimum for the recipe.

| Hydroperoxymethane | | | $FeSO_4.7H_2O$ Parts | Mols Hydroperoxymethane per Mol Fe++ | Conversion, Percent | | |
|---|---|---|---|---|---|---|---|
| From (Parent Compound) | Parts | Millimols | | | 2 Hrs. | 5 Hrs. | 7 Hrs. |
| Dimethyl(dichlorophenyl)methane | 0.084 | 0.38 | 0.14 | 0.75 | 18.4 | 53.3 | 77.1 |
| Do | 0.11 | 0.5 | 0.14 | 1.0 | 23.0 | 65.3 | 86.1 |
| Do | 0.165 | 0.75 | 0.14 | 1.5 | 29.5 | 75.8 | 91.7 |
| Do | 0.221 | 1.0 | 0.14 | 2.0 | 20.6 | 58.8 | 85.0 |
| Dimethylphenylmethane | 0.10 | 0.66 | 0.14 | 1.3 | 9.8 | 30.0 | 42.1 |

As will be evident to those skilled in the art, various modifications of this invention can be made, or followed, in the light of the foregoing disclosure and discussion, without departing from the spirit or scope of the disclosure or from the scope of the claims.

We claim:

1. An improved process for the production of synthetic rubber, which comprises establishing and maintaining at a polymerization temperature between 10 and −40° C. an emulsion of an aqueous phase having a pH between 9 and 12, a liquid monomeric material comprising a major amount of 1,3-butadiene and a minor amount of styrene, an alkali metal soap emulsifying agent, an alkyl mercaptan having between eight and sixteen carbon atoms per molecule, and a polymerization catalyst composition comprising 0.1 to 10 millimols of dimethyl(chlorophenyl)hydroperoxymethane together with 0.1 to 3 millimols of an alkali metal ferrous pyrophosphate complex and a reducing sugar, said parts being parts by weight per 100 parts of said monomeric material.

2. An improved process for the production of synthetic rubber, which comprises establishing and maintaining at a polymerization temperature between 10 and −40° C. an emulsion of an aqueous phase having a pH between 9 and 12, a liquid monomeric material comprising a major amount of 1,3-butadiene and a minor amount of styrene, an alkali metal soap emulsifying agent, an alkyl mercaptan having between eight and sixteen carbon atoms per molecule, and a polymerization catalyst composition comprising 0.1 to 10 millimols of a dimethyl(halophenyl)hydroperoxymethane containing not more than four halogen atoms each selected from the group consisting of fluorine, chlorine and bromine together with 0.1 to 3 millimols of an alkali metal ferrous pyrophosphate complex and a reducing sugar, said parts being parts by weight per 100 parts of said monomeric material.

3. In the production of synthetic rubber by polymerization of a monomeric material comprising a conjugated diene having not more than six carbon atoms per molecule while dispersed in an aqueous medium in the presence of a catalytic composition comprising an oxidant and a reductant, the improvement which comprises polymerizing said monomeric material in the presence of 0.1 to 10 millimols of dimethyl(chlorophenyl)hydroperoxymethane per 100 parts by weight of said monomeric material together with a material which acts as a reductant in the presence of said hydroperoxide under said conditions of polymerization.

4. An improved process for the production of synthetic rubber, which comprises establishing and maintaining at a polymerization temperature between 10 and −40° C. an emulsion of an aqueous phase having a pH between 9 and 12, a liquid monomeric material comprising a major amount of 1,3-butadiene and a minor amount of styrene, an alkali metal soap emulsifying agent, an alkyl mercaptan having between eight and sixteen carbon atoms per molecule, and a polymerization catalyst composition comprising 0.1 to 10 millimols of dimethyl(dichlorophenyl)hydroperoxymethane together with 0.1 to 3 millimols of an alkali metal ferrous pyrophosphate complex and a reducing sugar, said parts being parts by weight per 100 parts of said monomeric material.

5. In the polymerization of a monomeric material comprising a conjugated diene having not more than six carbon atoms per molecule while dispersed in an aqueous medium in the presence of a catalytic composition comprising an oxidant and a reductant, the improvement which comprises polymerizing said monomeric material in the presence of 0.1 to 10 millimols of dimethyl(dichlorophenyl)hydroperoxymethane per 100 parts by weight of said monomeric material together with a material which acts as a reductant in the presence of said hydroperoxide under said conditions of polymerization.

6. In the polymerization of a monomeric material comprising a conjugated diene having not more than six carbon atoms per molecule while dispersed in an aqueous medium in the presence of a catalytic composition comprising an oxidant and a reductant, the improvement which comprises polymerizing said monomeric material in the presence of a dimethyl(halophenyl)hydroperoxymethane containing not more than four halogen atoms each selected from the group consisting of fluorine, chlorine and bromine together with a material which acts as a reductant in the presence of said hydroperoxide under said conditions of polymerization.

7. The process of claim 6 in which said hydroperoxymethane is dimethyl(chlorophenyl)hydroperoxymethane.

8. The process of claim 6 in which said hydroperoxymethane is a dimethyl(dihalophenyl)hydroperoxymethane.

9. The process of claim 6 in which said hydroperoxymethane is dimethyl(dichlorophenyl)hydroperoxymethane.

10. An improved process for polymerizing a monomeric material comprising an unsaturated organic material containing a $CH_2=C<$ group and polymerizable when dispersed in an aqueous emulsion in the presence of a polymerization catalyst composition comprising an oxidant and a reductant, which comprises polymerizing such a monomeric material dispersed in an aqueous medium in the presence of such a polymerization catalyst comprising dimethyl(dichlorophenyl)-hydroperoxymethane as said oxidant.

11. An improved process for polymerizing a monomeric material comprising an unsaturated organic material containing a $CH_2=C<$ group and polymerizable when dispersed in an aqueous emulsion in the presence of a polymerization catalyst composition comprising an oxidant and a reductant, which comprises polymerizing such a monomeric material dispersed in an aqueous medium in the presence of such a polymerization catalyst comprising as said oxidant a dimethyl(halophenyl)hydroperoxymethane containing not more than four halogen atoms each selected from the group consisting of fluorine, chlorine and bromine.

WILLIAM B. REYNOLDS.
JOHN E. WICKLATZ.
THOMAS J. KENNEDY.

References Cited in the file of this patent

UNITED STATES PATENTS

| Number | Name | Date |
|---|---|---|
| 2,446,797 | Vaughn et al. | Aug. 10, 1948 |
| 2,534,447 | Hulse | Dec. 19, 1950 |

OTHER REFERENCES

Vandenberg et al., Ind. and Eng. Chem., vol. 40, No. 5, May 1948, pages 932, 937.

Shearon, Jr., et al., Ind. and Eng. Chem., vol. 40, No. 5, May 1948, pages 769–777.